April 14, 1964 P. A. ERKES 3,128,963
METHOD OF AND APPARATUS FOR TRANSFERRING A LOAD
BETWEEN TWO FLUID-CONTAINING RESERVOIRS
Filed Dec. 28, 1960
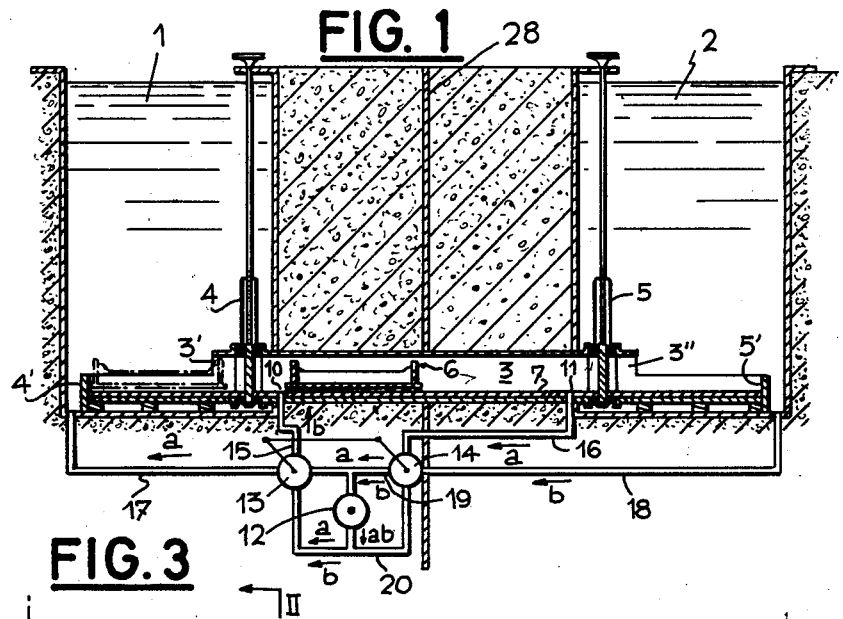
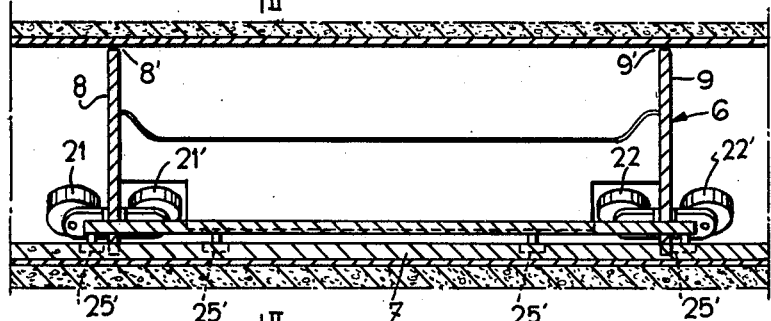
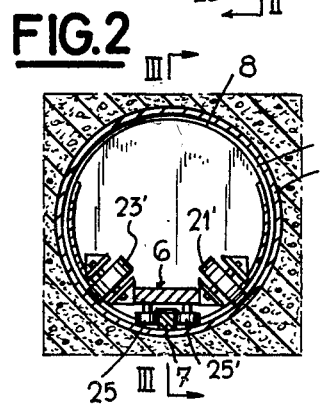
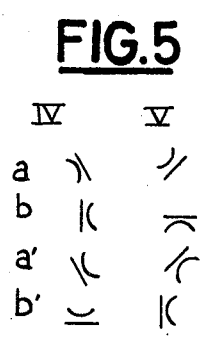

United States Patent Office 3,128,963
Patented Apr. 14, 1964

3,128,963
METHOD OF AND APPARATUS FOR TRANSFERRING A LOAD BETWEEN TWO FLUID-CONTAINING RESERVOIRS
Pierre Alphone Erkes, Ixelles, Brussels, Belgium, assignor to Bureau d'Etudes Nucleaires en abrege B.E.N., Brussels, Belgium
Filed Dec. 28, 1960, Ser. No. 78,988
Claims priority, application Belgium Jan. 5, 1960
1 Claim. (Cl. 243—1)

This invention relates to a method and apparatus for transferring a load between two places, and more particularly between two fluid-containing reservoirs, which is of particular use in the nuclear power industry.

A frequent problem in nuclear power stations is the transportation of a load, such as a fuel element, from one fluid-containing reservoir to another. In known solutions of this problem one of the reservoirs is enclosed in a sealing-tight covering, the load passing therethrough, for instance, by means of an intermediate transfer reservoir interconnecting the other two reservoirs. In this arrangement the transfer reservoir must be of considerable size because the load is moved in a vertical direction (the fuel element being disposed in a sheath hanging vertically from an endless chain). Movement of the secondary or transfer reservoir through the covering leads to serious difficulties, inter alia, because the covering must be reinforced at the level at which the transfer reservoir passes through it. In other solutions of the problem, the transfer is achieved through an inclined tube by the aid of gravity in co-operation with mechanical transferring devices.

This invention provides a simple solution of problems of this kind, the load being passed through a tube much narrower than that of the known transfer reservoirs. The method according to the invention of transporting the load is similar to the known pneumatic conveying method used to move dispatches from place to place. Like this known conveying method, the method according to the invention uses a load support in the form of a cradle having near each end a piston slightly narrower than the diameter of a tube connecting a departure station to an arrival station. However, the method according to the invention differs from the known pneumatic conveying method not only because the field of application is different but also because the fluids contained in the reservoirs are themselves used as transferring means, and because the transferred load is always immersed in one fluid or the other because of clearance between the pistons and the tube. Furthermore, a transfer in either direction is performed in two phases distinguished by different actions of the driving fluid or fluids on the pistons due to the presence of a lock arrangement along the path which the cradle travels.

Details of the method and apparatus according to the invention will become apparent from the following description of an embodiment of the invention given by way of non-limitative example, reference being made to the accompanying drawings wherein:

FIG. 1 is a diagrammatic axial sectional view through two reservoirs between which it is required to transfer a load, and of the apparatus according to the invention which interconnects such reservoirs;

FIG. 2 is a cross-section, to an enlarged scale and taken along the line II—II of FIG. 3, of the connecting tube;

FIG. 3 is a partial longitudinal section taken along the line III—III of FIG. 2, of the same connecting tube;

FIG. 4 is a sectional view to an enlarged scale of a plug cock used in an apparatus according to the invention, and FIG. 5 diagrammatically illustrates the orientations taken up by the plugs of the cocks which co-operate in accordance with the invention during the consecutive phases of a transfer operation.

Referring to FIG. 1, two reservoirs 1, 2 are connected to one another by a preferably horizontal tube 3 of a cross-section depending upon the size of the articles to be transferred. The tube 3 extends through a screen 28. Each end of the tube 3 opens into one of the reservoirs; one end is associated with a closure valve 4, while the other end is associated with a closure valve 5. At least one of the valves 4, 5 is closed at any time. That part of the tube 3 which is disposed between the two valves 4, 5 forms a lock.

In the example described and illustrated, a load can be transferred between the two reservoirs by a carriage 6 which is provided with rollers and which moves inside the tube, running on the inside surface thereof. The carriage 6 is maintained horizontal by a guide rail 7. The carriage guideway is extended beyond the two valves 4, 5 so that the carriage is accessible from above when at the end of its travel and as shown by chain-dotted lines at both ends of FIG. 1. The carriage 6 has at each end a plate 8 and a plate 9, each such plate acting as a piston and having a diameter slightly less than the tube diameter. Consequently, a gap 8', 9' is left between each plate and the tube, such gaps being determined for each particular application in dependence upon the possible deformations of the tube and the kinetic and hydrodynamic features of the transfer. When the carriage is at the end of its travel, for instance, in the chain-dotted-line position on the left-hand of FIG. 1, the carriage piston near the closure valve remains in an extension of the tube 3 beyond the valve. Such extensions are denoted by 3' and 3" and open into troughs, as 4' 5', adapted to receive the carriage 6.

The fluid in the two reservoirs 1, 2 is used as a driving fluid acting upon the two pistons of the carriage to perform the transfer. To this end, the transfer tube 3 is connected, through two narrow apertures 10, 11 adjacent valves 4, 5 to a circuit containing a pump 12 and a system of cocks. In its simplest form, the system of cocks can consist merely of two coupled four-way cocks 13, 14 or a single cock of appropriate design. The circuit also comprises piping for connection to the two reservoirs 1, 2. The connecting piping comprises two tubes 15, 16 connected to the apertures 10, 11 and to the cocks 13, 14, and piping 17, 18 extending to the reservoirs 1, 2, and piping 19, 20 between which the pump 12 is connected.

The transfer operation is as follows:

The piston 9 is engaged in the tube. The carriage 6 is in its end position in the reservoir 1, and the isolating valves 4, 5 are closed. The load to be transferred is placed in the carriage 6 and the valve 4 is opened. The cocks in the pump circuit are so positioned that the part of the tube which extends between the valve 5 and the piston 9 is connected to the reservoir 1. The pump 12 is started to exert a suction between tube 3 through the aperture 11, and deliver material to the reservoir 1 through the pipe 17. Because of the difference between the pressures operative on the surfaces of the two pistons 8, 9, the carriage 6 moves in the tube until the piston 9 is adjacent aperture 11. The pump 12 is then stopped, the valve 4 closed and the valve 5 opened. The cocks in the pump circuit are then so positioned that the reservoir 2 is connected to that part of the tube 3 between the valve 4 and the piston 8. The pump 12 is started, and is operative to suck material from the reservoir 2 through the pipe 18, and deliver the material to the tube 3 through the aperture 10. Because of the difference between the pressures operative on the surfaces of the two pistons 8, 9, the carriage moves to the right in FIG. 1 until reaching its end position in trough 5, the piston 8 remaining in the tube 3. The pump 12 is then stopped and the valve 5 closed. The load is removed from the carriage 6. The sequence of operations is then performed in reverse order to return the carriage from the reservoir 2 to the reservoir 1.

The direction in which the pumped fluid flows is indicated by the two sets of arrows *a, b,* the arrows *a* showing the flow during the first phase, while the arrows *b* show the flow during the second phase. In FIG. 5, where the closure valves have the Roman number references IV and V, the references *a'* and *b'* refer to a movement in a direction opposite to that of *a* and *b* respectively.

FIG. 2 illustrates details of the system for guiding the carriage 6 in the tube 3. The carriage 6 runs on radial rollers, as 21, 21', 22, 22', 23, 23' 24, 24', not all of which are shown in the drawings, and is guided by the rail 7 which is disposed between rollers 25, 25'.

The four-way cocks 13, 14 are plug cocks, as 13', which are formed with one passage 26 along a diameter, as shown in FIG. 4, and with one passage 27 adapted to interconnect two adjacent conduits at right-angles to one another. Of course, the cocks 13, 14 can be combined to form a single cock. The relative orientations of the plugs of the two cocks, which may or may not be coupled together mechanically is as shown in FIG. 5 which is self-evident.

There is no basic objection to the fluids in the reservoirs 1 and 2 being different from one another. In such a case the enclosed chamber bounded by the closed valves 4 and 5 can be rinsed with a third fluid.

What is claimed is:

In a method for transferring a load, contained in a carriage having a piston at each end, between a first fluid containing reservoir and a second fluid containing reservoir, through a tube connecting said reservoir, the diameter of said tube being slightly greater than the diameter of said pistons of said carriage, a first valve being provided in said tube to close communication with said first reservoir, a second valve being provided in said tube to close communication with said second reservoir, and means being provided near both said valves for retaining at least one of said pistons in said tube, the method comprising opening said first valve while said carriage is in said first reservoir and said second valve is closed, establishing a suction in said tube between said carriage and said second valve to move said carriage from said first reservoir through said tube towards the second reservoir, closing said first valve when the carriage is within said tube, opening said second valve, establishing in said tube between said first valve and said carriage a pressure higher than that in said second reservoir and sufficient to move said carriage into said second reservoir, and closing said second valve when said carriage is in said second reservoir.

References Cited in the file of this patent

UNITED STATES PATENTS

| | | |
|---|---|---|
| 393,584 | Robinson | Nov. 27, 1888 |
| 615,475 | Carlson | Dec. 6, 1898 |
| 847,234 | Burton | Mar. 12, 1907 |
| 2,529,777 | McInnis | Nov. 14, 1950 |